July 11, 1967 W. POLLAK 3,330,593
CLOSURE COUNTERBALANCE
Filed March 23, 1966 2 Sheets-Sheet 2

INVENTOR.
Walter Pollak
BY
W. S. Pettigrew
ATTORNEY 3,330,593
CLOSURE COUNTERBALANCE
Walter Pollak, Detroit, Mich., assignor to General Motors Corporation, Detroit, Mich., a corporation of Delaware
Filed Mar. 23, 1966, Ser. No. 536,714
1 Claim. (Cl. 296—76)

This invention relate to closure counterbalances and more particularly to counterbalance arrangements for a vehicle body deck lid or the like.

One feature of this invention is that it provides a new and improved counterbalance arrangement for a vehicle body closure. Another feature of this invention is that it provides a new and improved counterbalance arrangement for a vehicle body closure wherein the counterbalancing bias is provided by an air spring device of exceedingly simple construction requiring but little space in the body. A further feature of this invention is in the provision of a counterbalancing arrangement according to the foregoing wherein telescopically related cup members defining a closed chamber are operatively connected between the body and the closure member in such manner that movement of the closure member from open to closed position telescopes the cup members to compress a predetermined quantity or working mass of air within the chamber whereby to provide a bias on the closure member moving it from closed to open positions. Other features of the invention reside in the connection of the cup members between the body and the closure member in such manner as to permit telescopic movement of the closely interfitting cup members without binding therebetween and maximum application of biasing energy to the closure member as it moves between open and closed positions.

These and other more detailed features and advantages of the invention will be readily apparent from the following specification and the drawings wherein:

FIGURE 3 is a further view similar to FIGURE 1 showing a third embodiment of a closure counterbalance arrangement according to the invention.

Figure 1:
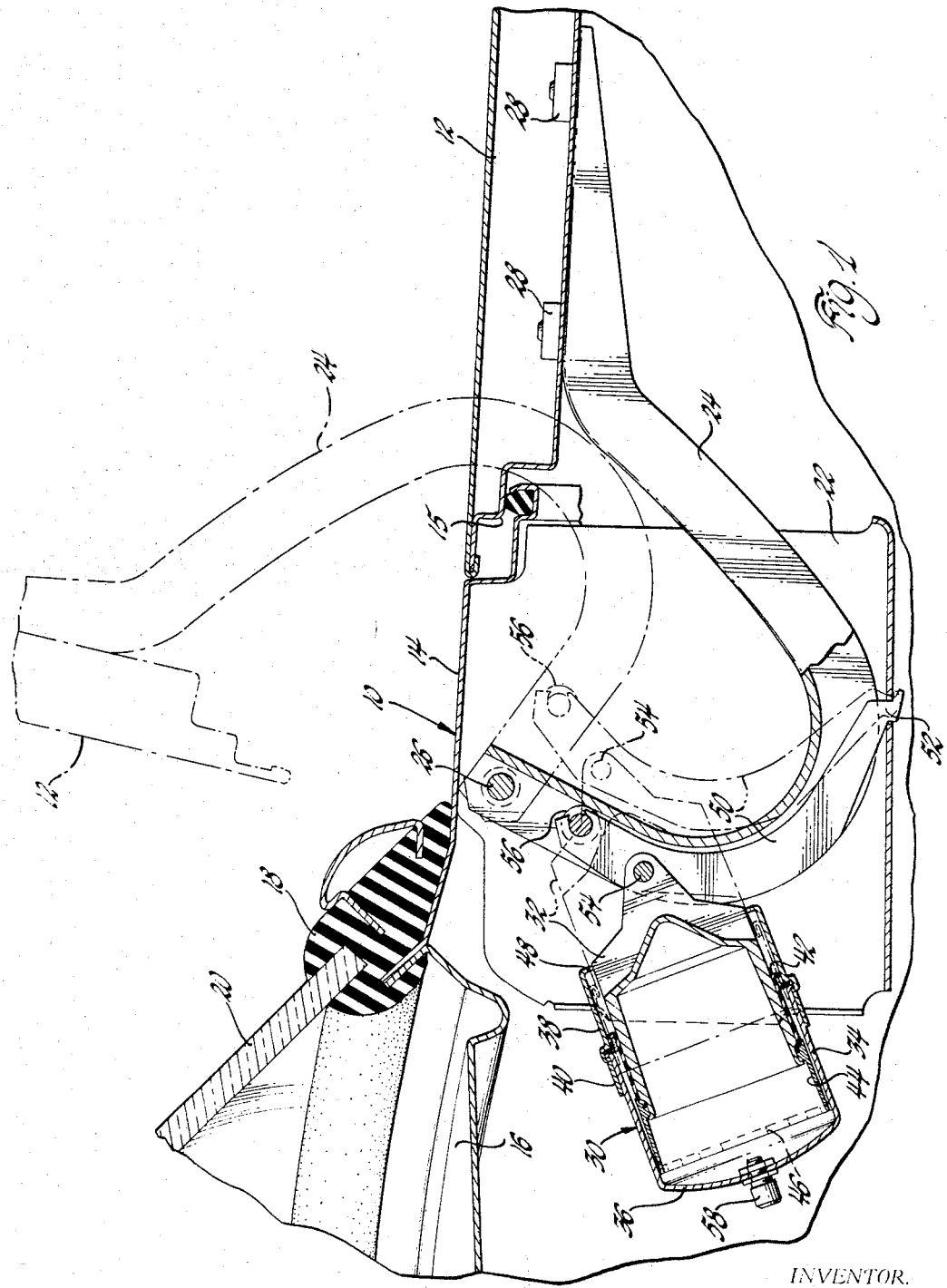
FIGURE 1 is a fragmentary sectional view of a deck portion of a vehicle body including a closure counterbalance arrangement according to the invention.

Referring now particularly to FIGURE 1 of the drawings, a first embodiment of the invention is shown installed in a vehicle body designated generally as 10 and in conjunction with a vehicle body deck lid 12, and while the subsequent embodiments of the invention are also shown and described with reference to such a deck lid, it will be understood that the invention is equally applicable to other vehicle body and similar closure installations such as doors, hoods, etc.

The rear deck portion of body 10 shown in the drawings, conventionally includes a tulip panel 14 which carries adjacent its rearward edge 15 means for sealing the forward edge portion of deck lid 12 and which is joined adjacent its forward edge with a rear shelf panel 16. A decorative retaining strip and moulding assembly 18 is mounted on the joined flanges of the shelf and tulip panels and secures the lower edge portion of the glass backlite 20 of the body. Welded or otherwise suitably secured to the tulip panel 14 and to adjacent other structure of the body at spaced transverse locations therein are a pair of generally conventional hinge boxes 22, only one of which is shown in section for purposes of convenience. A conventional gooseneck hinge member 24 of channel cross section is suitably pivoted within the hinge box 22 at 26 and is bolted at a number of locations 28 to the forward edge portion of deck lid 12 to mount the deck lid for forward and upward swinging movement from a closed position as shown in full lines, to an open position indicated in broke lines.

In accordance with the invention, an arrangement of an air spring device designated generally as 30 is provided for counterbalancing and biasing the deck lid from the closed to the open position thereof. Preferably, one such device is provided for each hinge member 24. The device takes the exceedingly compact form of a pair of telescopically related cup members 32 and 34, cup 32 in this embodiment being preferably of cast construction and cup 34 being of drawn sheet metal. The outer cup 34 includes lower and upper portions 36 and 38 secured together by any suitable means such as a circumferential band 40 holding mating lip flanges of the cups together. Between these flanges of the portions 36 and 38, there is pinched one circumferential edge portion of a cylindrical sealing sleeve or rolling diaphragm 42 of rubber or other suitable material having its other edge pinched to one end of the internal end of cup 32 by a retaining sleeve 44 which serves as an extension of the cup. Cup 32 is telescopic within cup 34 between a chamber contracting or compressed position shown in full lines to an expanded position indicated in broken lines, wherein a segmental bead 46 on the internal end of sleeve 44 engages an upper flange 48 on cup 34 to provide a limit stop. Although not specifically shown, outer cup 34 will be understood as being rapidly mounted to the hinge box 22 opposite hinge member 24 as by welding or by bolting or similar securing of suitable portions of the band 40 to the vertical sides of the box. Accordingly, the operating movement of the device is that of substantially rectilinear movement of the cup 32 relative to cup 34 and the hinge box in the indicated manner.

For providing the operative engagement of the device to the deck lid 12, an arcuate lever 50 has a tab foot 52 thereof received in an aperture of the base of the hinge box 22 for limited oscillation therein, and has pivotal connection intermediate its ends at 54 with an ear of the cup 32. Lever 50 is received between the legs of the hinge member 24 and carries at its upper end a roller 56 engaging the base portion of the hinge member for traversal thereover as the lever moves with cup 32 between the solid and broken line positions shown.

The base portion of cup 34 is apertured to mount an air filling check valve 58 for permitting introduction and trapping of a predetermined quantity or working mass of air within the chamber defined by the cups 32 and 34, but otherwise such chamber is completely closed by diaphragm 42.

In operation and assuming the deck lid 12 to be in initially open position, it is apparent that downward movement of the deck lid toward closed position causes lever 50 to telescope cup 32 within cup 34 from the expanded position to the chamber contracting position. Preferably, the pressure of the air contained within the chamber of the cups in the expanded position thereof is set to produce a force on lever 50 equalling or counterbalancing the force of the weight of the deck lid in open position. By the telescopic contraction of the cups during movement of the deck lid to closed position, cup 32, of course, acts as a piston causing substantial compression of the working air mass to the point desired for subsequent bias or pop-open of the deck lid from closed to open positions. The biasing force required will vary from installation to installation, and the device may be matched to given conditions by suitable selection of the diameter of the cups and the stroke of the cup 32. The pivoting lever 50 and roller 56 provide for shifting of the normal or tangential engagement with hinge member 24 for maximum application of biasing force while further preventing binding between the cups during stroking of cup 32.

Figure 2:
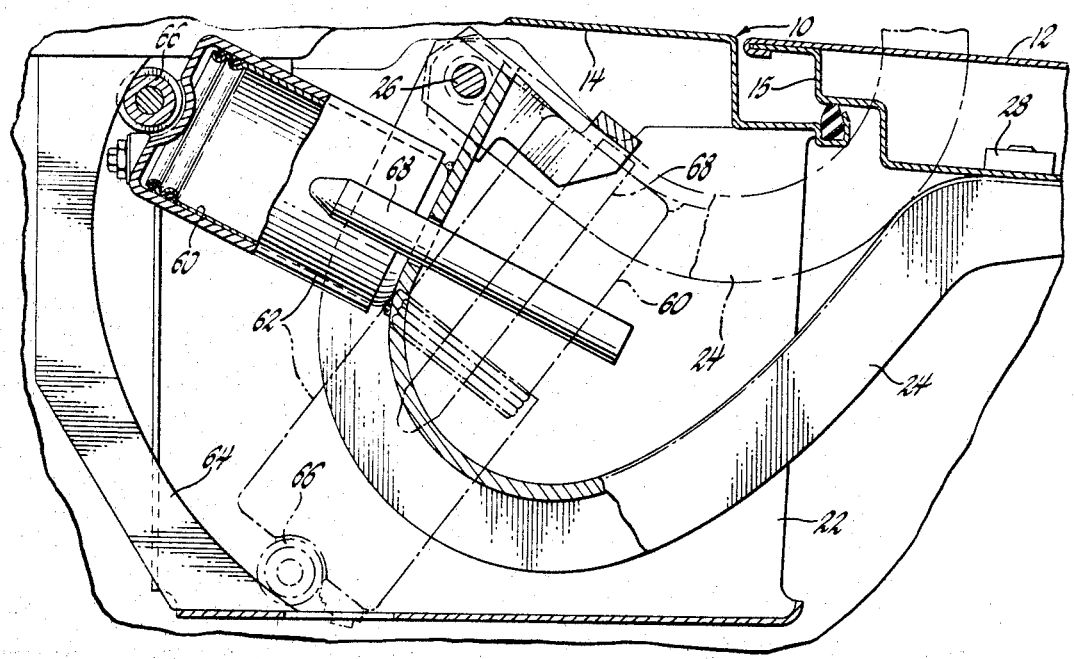
FIGURE 2 is a view similar to FIGURE 1 showing a second embodiment of a closure counterbalance arrangement according to the invention.
Figure 5:
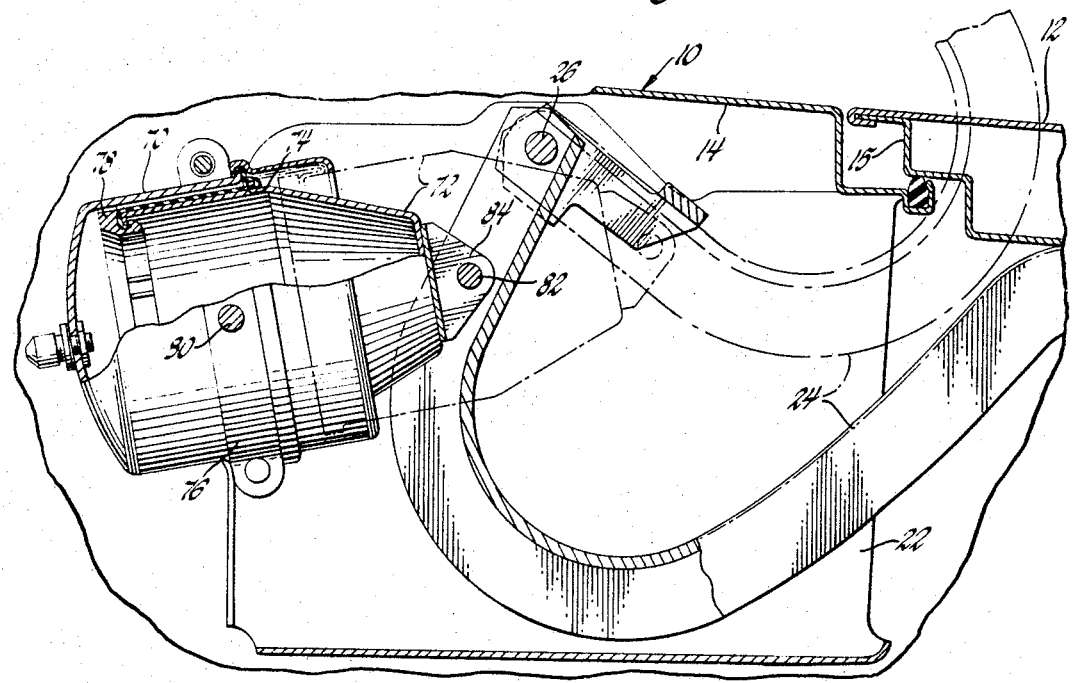

Referring now to FIGURE 2 of the drawings, there is shown a second embodiment of a closure counterbalance arrangement according to the invention with like numerals referring to like parts. In this embodiment, the device again takes the form of a pair of telescopically related cups 60 and 62, outer cup 62 being of cast construction and inner cup 60 being of drawn sheet metal. O-ring seals are provided in flutes of cup 60. In contrast with the prior construction, the inner cup 60 is fixed to hinge member 34 between the legs thereof for movement therewith as the deck lid moves between open and closed positions. By the telescopic joining of the two cups, cup 62 is also carried with the hinge member during traversal of the deck lid, but moves relative to the hinge member between the chamber contracting or compressed position between the legs thereof, shown in full lines, and the expanded position indicated in broken lines. The stroke of cup 62 is determined by a cam track member 64 mounted within hinge box 22 opposite hinge member 24 and engaged by a flanged roller 66 rotatably carried on the end of cup 62. For aiding roller 66 in guidance of cup 62 during shifting of the line of biasing action, a pair of semi-cylindrical projections 68 formed on the sides of the cup adjacent the legs of the hinge member 24 are received in spaced semi-cylindrical apertures in the base of the hinge member. Again, the two cups provide a chamber containing a predetermined quantity or working mass of air at a predetermined pressure in expanded position counterbalancing the deck lid in open position, and forced movement of the deck lid downwardly to closed position bodily moves and telescopes the cup 62 along cam track 64 to the compressed position wherein the trapped air is sufficiently compressed to provide the desired bias or pop-open on the deck lid.

In FIGURE 3, a third embodiment is shown with like numerals again referring to like parts. Here, a pair of cups 70 and 72 are both of drawn sheet metal construction with a rolling diaphragm 74 therebetween. The outer cup 70 is again formed of two portions lip-flanged and retained together by a band 76, with one end of the diaphragm 74 being pinched between the flanges and the other end retained by an extension sleeve 78 on inner cup 72. In this embodiment, the outer cup 70 is swingably mounted to opposite side walls of the hinge box 22 as by pivot studs 80 on band 76, only one being shown. For operative connection to the hinge member 24, a pivot pin 82 therein extends through an ear 84 fixed to the base of cup 72. During hinge travel, the pin 82 defines an arc about pivot 26 of the hinge member such as to require shifting or oscillation of the biasing line or axis of telescoping movement of the device during the travel of the cup 72 relative to cup 70 between chamber contracting and expanded positions. Such oscillation is readily accommodated by the pivots 80.

Having thus described the invention, what is claimed is:
In a vehicle body, the combination comprising,
a closure member,
a hinge member swingably mounted on said body,
means mounting said closure member on said hinge member for swinging movement of said closure member between open and closed positions,
a counterbalance device including a pair of telescopically related cups defining a closed chamber containing a predetermined working mass of fluid, and sealing means intermediate said cups, and means operatively connecting said device between said body and said hinge member in a manner to telescope said cups and concurrently shift the line of application of biasing force between said device and said closure member as said closure member moves between said positions thereof, said mass of fluid being sufficiently compressed within said chamber in the open position of said closure member to counterbalance said closure member therein and being further compressed by the telescoping movement of said cups with movement of said closure member to the closed position thereof to provide a bias for said closure member from the closed to the open position thereof, said operative connecting means including means fixedly mounting one of said cups to said hinge member and roller means on the other of said cups engaging a roller cam track on said body.

References Cited
UNITED STATES PATENTS

| | | | |
|---|---|---|---|
| 2,253,161 | 8/1941 | Atwood | 296—76 X |
| 2,535,600 | 12/1950 | Rappl | 296—76 |
| 2,594,643 | 4/1952 | Gustisha | 296—76 |
| 2,747,923 | 5/1956 | McLean | 296—76 |
| 2,748,855 | 6/1956 | Siems et al. | 49—379 |
| 3,031,180 | 3/1962 | Sergay | 267—65 |

BENJAMIN HERSH, *Primary Examiner.*

J. H. BRANNEN, *Assistant Examiner.*